{ | United States Patent [19] | [11] | 4,416,921 |
| Dunn | [45] | Nov. 22, 1983 |

[54] COMPOSITION AND PROCESS FOR THE IMPREGNATION AND SEALING OF POROUS ARTICLES

[75] Inventor: David J. Dunn, Twinsburg, Ohio

[73] Assignee: Loctite (Ireland) Limited, Dublin, Ireland

[21] Appl. No.: 284,284

[22] Filed: Jul. 17, 1981

Related U.S. Application Data

[63] Continuation of Ser. No. 112,777, Jan. 17, 1980, abandoned.

[51] Int. Cl.³ .......................... B05D 3/12; B05D 3/02; C08F 22/26
[52] U.S. Cl. ......................................... 427/353; 148/6; 148/6.14 R; 427/294; 427/295; 427/385.5; 427/388.2; 427/399; 526/320; 526/323.1

[58] Field of Search ............... 427/295, 294, 340, 353, 427/385.5, 399, 388.2; 526/323.1, 320, 292; 148/6, 6.14 R

[56] References Cited

U.S. PATENT DOCUMENTS

| 3,672,942 | 6/1972 | Neumann et al. | 427/340 |
| 4,147,821 | 4/1979 | Young | 427/295 |
| 4,165,400 | 8/1979 | Demarco | 427/295 |

Primary Examiner—Thurman K. Page
Attorney, Agent, or Firm—Eugene F. Miller; J. Rodney Reck

[57] ABSTRACT

A composition of matter which is useful in a process for impregnating and sealing of porous articles, the composition comprising:
(a) an azonitrile;
(b) a polymerizable acrylic monomer;
(c) a substituted, sterically-hindered phenol; and
(d) a metal ion chelator.

6 Claims, No Drawings

COMPOSITION AND PROCESS FOR THE IMPREGNATION AND SEALING OF POROUS ARTICLES

This is a continuation of application Ser. No. 112,777 filed Jan. 17, 1980, now abandoned.

This invention relates to a composition for the impregnation and sealing of porous articles.

Porous articles, and particularly porous metal articles such as castings and sintered metal parts, frequently must be sealed and impregnated before use. This is necessary to make the article capable of withstanding liquid or gas pressure during use, and also to increase its density, improve its strength, reduce corrosion, and frequently to prepare the surface of the article for a subsequent painting or plating operation. A wide variety of porous metal articles is used commercially today, manufactured from a wide variety of metals. Zinc, copper, iron, aluminum, brass and various other alloys are among the common metals needing to be sealed. Other important materials which frequently need to be sealed are wood and ceramics.

The prior art has recognized the need to seal and impregnate these articles for many years. Early sealing processes generally involved the use of either an inorganic sealant, such as sodium silicate, or an organic composition such as varnish. In more recent years, substances such as unsaturated alkyds, epoxies, and various other unsaturated monomers, such as diallylphthalate, have been used. See, for example, U.S. Pat. Nos. 3,345,205 to Raech, issued Oct. 3, 1967; 2,932,583 to Grana, issued Apr. 12, 1960; and 2,554,254 to Kroft, issued May 22, 1951.

It is customary to place the porous articles and the composition in a tank from which the air above the composition is subsequently evacuated. This removes most of the air from the pores of the articles. Normal pressure is restored with the articles submerged in the composition. This drives the composition into the pores. The articles are then removed from the tank. A further quantity of the composition is added to that in the tank to replace the quantity lost to the impregnated articles, whereupon the tank and contents are ready to receive further porous articles. This process is called a vacuum cycle.

Substantially improved compositions for impregnating porous articles are described in U.S. Pat. No. 3,672,942 (the disclosure of which is incorporated herein by reference), which relates to impregnation with polymerizable anaerobic monomers.

These anaerobic compositions, however, must be supplied in two parts, one of which contains a catalytic accelerator of polymerization and must be added to the other part before use. The resulting mixture is unfortunately liable to undergo premature polymerization, e.g., from contact with transition metals, and must be constantly aerated to prevent this, for example during the intervals between vacuum cycles. This is a drawback to the use of the compositions, as is their two-part nature.

Recent commercial compositions have employed styrene-based polyester monomer impregnants which are used with peroxy-type initiators and are cured by heat.

These compositions are also presented in two parts, one of which contains the polymerizable component and the other the initiator or catalyst. This is a disadvantage. The one part usually has a useful shelf life of only 4 to 6 months at room temperature, while refrigeration is desirable for storing the other part. These are disadvantages likewise. Cure is effected by subjecting impregnated articles to relatively high temperatures such as 120°–150° C. for extended periods such as 45–90 minutes, the necessity for which processing may be regarded as a further disadvantage. The compositions, like the anaerobic ones mentioned earlier, are sensitive to contact with transition metals, even in trace amounts, such contact tending to cause premature polymerization, of the mixture of the two parts.

The mentioned drawbacks of the styrene-based compositions are common to all sealant compositions which employ peroxy compounds as part of their cure system. The peroxy compounds referred to include peroxides, peresters and hydroperoxides.

The invention seeks to overcome some or all of the mentioned disadvantages and drawbacks of the sealing and impregnating compositions of the prior art.

The invention accordingly provides a composition for the impregnation and sealing of porous articles which composition comprises (a) an azonitrile
(b) a polymerizable acrylic compound, conventionally and hereinafter referred to as a monomer
(c) a stabilizer of free radicals, and
(d) a metal ion chelator.

The composition may also contain a detergent. A novel feature of the composition is the presence of (a) an azonitrile, the combination of (b), (c) and (d) in a sealant composition being known. The function of the azonitrile is to yield free radicals when decomposed by heat. Heat is applied to cure the composition, and the resulting free radicals polymerize the monomer.

(a) The azonitrile is a compound of formula I

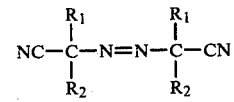

wherein $R_1$ is a methyl, ethyl, n-propyl, iso-propyl, iso-butyl or n-pentyl radical, and $R_2$ is a methyl, ethyl, n-propyl, iso-propyl, cyclopropyl, carboxy-n-propyl, iso-butyl, cyclobutyl, n-pentyl, neo-pentyl, cyclopentyl, cyclohexyl, phenyl, benzyl, p-chlorobenzyl or p-nitrobenzyl radical or $R_1$ and $R_2$, taken together with the carbon atom to which they are attached, represent a radical of the formula

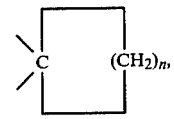

wherein n is an integer from 3 to 9, or the radical

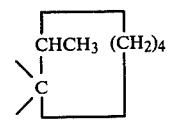

A preferred azonitrile is 2,2'-azobis (iso-butyronitrile) hereinafter designated AZBN.

The proportion of the azonitrile in the composition is 500 to 10000 parts per million (ppm) by weight, preferably 1000 to 5000 ppm.

(b) The polymerizable acrylic compound comprises one or more members selected from the whole class of acrylate-terminated compounds known for use as polymerizable monomers in adhesive and sealing compositions. Examples of such compounds, including preferred monomers, are set out at the end of this specification. In general, they have the structure

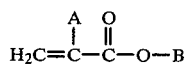

where A and B have meanings well known in the art. The proportion of polymerizable acrylic compound used in the composition of the invention is within the conventional range for adhesive and sealing compositions.

(c) The stabilizer of free radicals comprises one or more members selected from the class of quinones, phenols and substituted phenols. Substituted phenols are preferred. Especially preferred are those substituted phenols which are sterically hindered. Examples of quinones are B-naphthoquinone and p-benzoquinone. An example of a phenol is hydroquinone. Examples of substituted phenols are methoxyhydroquinone, 4-methyl phenol (p-cresol) and 3-methyl phenol (m-cresol). Examples of sterically hindered substituted phenols are 2,6-di-tert-butyl p-cresol and 2,5-di-tert-butyl hydroquinone, and these are, in fact, the most preferred free radical stabilizers for use in the composition of the invention.

The proportion of the stabilizer of free radicals in the composition is 10 to 2000 ppm by weight, preferably 400 to 1200 ppm.

The presence of the free radical stabilizer is essential for ensuring that the composition has acceptable stability in storage.

(d) The metal ion chelator comprises one or more members selected from the class of those compounds which react with metal ions by forming coordination bonds between a metal ion and two or more atoms (ligand atoms) of the molecule of the chelator, yielding a heterocyclic ring complex. The chelating agent does not materially affect the speed of cure of the anaerobic composition at the time of its use.

One class of chelating agents comprises those wherein all the ligand atoms are nitrogen. Typical examples of chelating agents in this class are dipyridyl, tripyridyl, phenanthroline, 1,2-bis(2'-pyridylmethyleneamino) ethane and 1,2-bis(6'-methyl-2'-pyridylmethyleneamino)ethane (hereinafter designated MPE).

Another class of chelating agents comprises those which possess a combination of oxygen and nitrogen ligand atoms, such as characterizes the a- and B-aminocarboxylates. Examples include the soluble polycarboxylated polyamines, such as the sodium derivatives of polycarboxylated alkylenediamines, e.g., tetrasodium ethylenediamine tetraacetic acid. Other chelating agents of this type are o-aminophenol and 8-hydroxyquinoline.

The proportion of the metal ion chelator in the composition is 1 to 1000 ppm by weight, preferably 10 to 500 ppm.

As stated above, the composition may also contain a detergent. This makes the uncured composition self-emulsifiable, which is useful when porous articles which have been impregnated and sealed are afterwards washed in an aqueous rinse solution to remove surplus or uncured composition. Suitable detergents are anionic or non-ionic surfactants, or mixtures thereof, provided the chosen detergent (a) is soluble in the polymerizable acrylic compound, and (b) has no significant adverse effect on the functional properties of the composition. Candidate detergents may be screened by simple empirical test methods such as those set out in U.S. Pat. No. 4,069,378.

The compositions of the invention are shelf-stable with full retention of activity for at least two years at room temperature. They comprise but one part, which renders them convenient and economical in use. They are cured rapidly by relatively mild heat treatment, compared with the compositions of the prior art. Thus, a composition of the invention is typically fully cured by immersion of a treated porous article in hot water at 80°–100° C. for 1–15 minutes. The compositions, in contrast to many known sealants, are not accelerated by contact with transition metals or their salts.

The invention will be understood in greater detail from the following examples, which are also intended to illustrate the function of the separate ingredients in the compositions of the invention. Amounts given in all cases are parts by weight.

EXAMPLE 1

The following compositions A and B were made up by simple admixture, and their gel times determined at 82° C. Gel time is determined by placing a charge of the compositions in a 75 mm × 12 mm glass test tube (about half filling it) and placing the tube in a heating bath of the required temperature at time O. Time T, recorded when the composition just ceases to be mobile, is the gel time at the given temperature. For special purposes, gel time can be defined in slightly different ways (see Example 2).

|  | A | B |
| --- | --- | --- |
| Polyethylene glycol dimethacrylate (PGD) | 99.839 | 99.989 |
| AZBN | 0.150 | — |
| p-benzoquinone | 0.010 | 0.010 |
| MPE | 0.001 | 0.001 |
| Gel time (minutes) | 7 | 300 + |

A was a composition of the invention, while B was a control. This example shows the effect of AZBN in accelerating polymerization when a composition of the invention is heated.

EXAMPLE 2

The following compositions C, D and E were made up by simple admixture, and tested for gel time at 82° C. and vitrification time at 82° C. Vitrification time is the time required to produce a completely solid polymer.

|  | C | D | E |
| --- | --- | --- | --- |
| PGD | 99.809 | 99.839 | 99.849 |
| AZBN | 0.150 | 0.150 | 0.150 |
| MPE | 0.001 | 0.001 | 0.001 |
| 2,6-di-tert-butyl p-cresol | 0.040 | — | — |

-continued

|  | C | D | E |
|---|---|---|---|
| p-benzoquinone | — | 0.010 | — |
| Gel time (minutes) | 5 | 7 | 2 |
| Vitrification time (minutes) | 6 | 17 | 3.5 |

C and D were compositions of the invention; E was a control. This example shows the superiority of a substituted phenol to an unsubstituted phenol as a stabilizer. Both act as polymerization inhibitors, as shown by the higher gel times of C and D as compared with E. But the unsubstituted phenol retards the subsequent polymerization much more than does the substituted one, as shown by the difference between the gel time and the vitrification time in D being greater than that in C.

EXAMPLE 3

The following compositions F and G were made up by simple admixture, and were tested for gel time at 82° C., vitrification time at 82° C., and stability at 35° C. Stability is defined here as the gel time of a 50 ml sample held in a 100 ml bottle of low density polyethylene at the indicated temperature, and may be regarded as a measure of the shelf life of a composition.

|  | F | G |
|---|---|---|
| PGD | 99.759 | 99.799 |
| AZBN | 0.200 | 0.200 |
| MPE | 0.001 | 0.001 |
| 2,6-di-tert-butyl p-cresol | 0.040 | — |
| Gel time (minutes) | 4.5 | 2 |
| Vitrification time (minutes) | 5 | 3.5 |
| Stability (weeks) | >26 | <4 |

F was a composition of the invention; G was a control. This example shows that while a substituted phenol has only a small deleterious effect on the cure speed (vitrification time) it dramatically improves the shelf life (stability).

EXAMPLE 4

The following compositions H and J were made up by simple admixture, and tested for gel time at 82° C., vitrification time at 82° C. and stability at 35° C.; these measurables are to be understood as defined in the previous examples.

|  | H | J |
|---|---|---|
| PGD | 99.519 | 99.515 |
| AZBN | 0.400 | 0.400 |
| MPE | 0.001 | 0.005 |
| 2,6-di-tert-butyl p-cresol | 0.080 | 0.080 |
| Gel time (minutes) | 3 | 3 |
| Vitrification time (minutes) | 3 | 3 |
| Stability (months) | <4 | 6 |

This example shows that a five-fold increase in the chelator concentration has no effect on cure speed but considerably improves shelf life.

EXAMPLE 5

The following composition K was made up by simple admixture. A sample of the freshly prepared composition was taken and tested for gel time at 82° C. and vitrification time at 82° C. The remainder of the composition was aged by allowing it to stand at room temperature for two years. A sample of the aged composition was taken and tested in the same way.

|  | K | |
|---|---|---|
| PGD | 99.755 | |
| AZBN | 0.200 | |
| MPE | 0.005 | |
| 2,6-di-tert-butyl p-cresol | 0.040 | |
|  | Fresh | Aged |
| Gel time (minutes) | 4 | 5 |
| Vitrification time (minutes) | 5 | 7 |

As can be seen from the above test results, this composition showed excellent shelf-stability, and retention of cure speed during storage.

EXAMPLE 6

To 99 parts of a sample of composition K was added 1 part (by weight) of copper powder, and the resulting mixture was divided into two portions, one of which was tested for gel time and vitrification time as described in Example 5. Approximately the same results were obtained as in that example, showing that the composition is insensitive to the presence of copper, as far as speed of cure is concerned. The same is found to be true in the cases of the other transition metals.

A 50 ml sample of the second portion, in a 100 ml bottle of low density polyethylene, was aged by storing it at 35° C. for one month, after which it was found to be still liquid. This aged sample was also tested for gel time and vitrification time as described in Example 5. Once again, approximately the same results were obtained as in that example. This shows the excellent shelf stability of the compositions of the invention in the presence of copper. The same is found to be true in the cases of the other transition metals, notably iron, cobalt and vanadium.

A further quantity of composition K was prepared, this time omitting the chelator (MPE), and 1% of copper powder incorporated. This mixture was tested as described in the first part of the present example, and the same results were obtained. This shows that the insensitivity to the presence of copper (and, by extension, the presence of other transition metals) is independent of the presence of a chelator in a composition of the invention.

EXAMPLE 7

Approximately 100 l of composition K was transferred to a vacuum tank (approximately 300 l) equipped with flexible connections to a vacuum pump.

The mixture was then used to impregnate die-cast aluminum parts. Prior to impregnation, the aluminum parts were water-washed and vapor phase-degreased to ensure cleanliness. The cleaned parts were placed in a stainless steel rack and suspended in the impregnation tank with the parts completely submerged in the impregnant. The tank was closed and sealed, and the air was evacuated by means of the vacuum pump.

An absolute pressure of approximately one inch of mercury was established in less than 2 minutes, and was maintained for about 10 minutes. Thereafter the vacuum pump was turned off and the pressure in the tank gradually increased by means of a bleed valve. After the tank had reached atmospheric pressure, it was opened and the rack of impregnated parts was removed from the liquid and allowed to drain for about 5 minutes.

The rack and contents were then suspended in 10% aqueous solution of Triton X-100 detergent. ("Triton" is a trade name of Rohm & Haas Co., Philadelphia and Triton X-100 is polyoxyethyleneated t-octyl-phenol containing 9-10 moles per mole of ethylene oxide). After about 2 mins. with slight agitation the rack was removed and submerged in water at 90° C. for 15 mins. The sealed porous metal pieces were found to have a smooth clean surface with no visible evidence of sealant on the surface. The sealant was found to have cured essentially to the outer surface of the castings.

Examples of polymerizable acrylic compounds suitable for use as ingredient (b) in the compositions of the invention are set out hereunder.

The most desirable monomers for use are polymerizable acrylate esters. Preferably at least a proportion of the acrylate monomer in the composition is a di- or other polyacrylate ester. These polyfunctional monomers produce cross-linked polymers, which serve as more effective and more durable sealants. While various anaerobically curing acrylate monomers may be used, limited by the solubility requirements described herein, the most highly preferred are polyacrylate esters which have the following general formula:

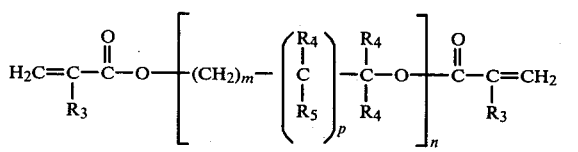

wherein $R_4$ represents a radical selected from the group consisting of hydrogen, lower alkyl of from 1 to about 4 carbon atoms, hydroxyalkyl of from 1 to about 4 carbon atoms, and

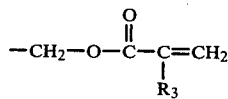

$R_3$ is a radical selected from the group consisting of hydrogen, halogen, and lower alkyl of from 1 to about 4 carbon atoms; $R_5$ is a radical selected from the group consisting of hydrogen, hydroxyl, and

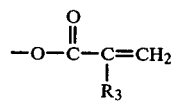

m is 0 or an integer from 1 to 12, and is preferably from 0 to 6; n is an integer equal to at least 1, e.g., 1 to 20 or more, and preferably between 2 and 6; and p is 0 or 1.

The polymerizable polyacrylate esters corresponding to the above general formula are exemplified by, but not restricted to, the following materials: di-, tri- and tetraethyleneglycol dimethacrylate, dipropyleneglycol dimethacrylate; polyethyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; tetramethylene dimethacrylate; ethylene dimethacrylate; and neopentylglycol diacrylate.

While polyacrylate esters, especially the polyacrylate esters described in the preceding paragraphs, have been found particularly desirable, monofunctional acrylate esters (esters containing one acrylate group) also may be used.

The most common of these monofunctional esters are the alkyl esters such as methyl methacrylate, ethyl methacrylate, propyl methacrylate and isobutyl methacrylate. Many of the lower molecular weight alkyl esters are quite volatile and frequently it is more desirable to use a higher molecular weight homolog, such as decyl methacrylate or dodecyl methacrylate.

When monofunctional acrylate esters are being chosen, it is preferable to choose an ester which has a relatively polar alcoholic moiety. Such materials are less volatile than low molecular weight alkyl esters and, in addition, the polar group tends to provide intermolecular attraction in the cure polymer, thus producing a more durable seal. Most preferably the polar group is selected from the group consisting of labile hydrogen, heterocyclic ring hydroxy, amino, cyano, and halogen polar groups. Typical examples of compounds within this category are cyclohexyl methacrylate, tetrahydrofurfuryl methacrylate, hydroxyethyl acrylate, hydroxypropyl methacrylate, t-butylaminoethyl methacrylate, cyanoethyl acrylate, and chloroethyl methacrylate.

Another preferred class of monomers is prepared by the reaction of a monofunctionally substituted alkyl or aryl acrylate ester containing an active hydrogen atom on the functional substituent. This monofunctional, acrylate-terminated material is reacted with an organic polyisocyanate in suitable proportions so as to convert all of the isocyanate groups to urethane or ureide groups.

The monofunctional alkyl and aryl acrylate esters are preferably the acrylates and methacrylates containing hydroxy or amino functional groups on the nonacrylates portion thereof. Acrylate esters suitable for use in the preparation of the latter class of monomers have the formula

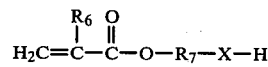

wherein X is selected from the group consisting of —O— and >$NR_8$ wherein $R_8$ is selected from the group consisting of hydrogen and alkyl of from 1 through 7 carbon atoms; $R_6$ is selected from the class consisting of hydrogen, chlorine and methyl and ethyl radicals; and $R_7$ is a bivalent organic radical selected from the group consisting of lower alkylene of 1 through 8 carbon atoms, phenylene and naphthylene. These groups upon proper reaction with a polyisocyanate, yield a sealant monomer of the following general formula

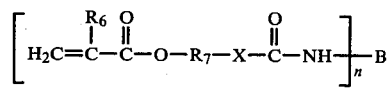

wherein n is an integer from 2 to 6; B is an n-valent organic radical selected from the group consisting of alkyl, alkenyl, cycloalkyl, cycloalkenyl, aryl, aralkyl, alkaryl and heterocyclic radicals both substituted and unsubstituted; and $R_6$, $R_7$ and X have the meanings given above.

The hydroxy- and amino-containing esters suitable for use in the preparation of the above monomeric products are exemplified by, but not limited to, such materials as hydroxyethyl acrylate, hydroxyethyl methacrylate, aminoethyl methacrylate, 3-hydroxypropyl methacrylate, aminopropyl methacrylate, hydroxyhexyl acrylate t-butylaminoethyl methacrylate and hydroxyoctyl methacrylate.

The preferred organic polyisocyanates comprise the higher alkenyl diisocyanates, the cycloalkenyl diisocyanates and the aromatic diisocyanates containing 8 or more carbon atoms and preferably from 8 to 30 carbon atoms, such for example as octamethylene diisocyanate, durene diisocyanate, 4,4'-diphenyl-diisocyanate, and toluene diisocyanate.

The proportions in which the reactants may be combined can be varied somewhat; however, it is generally preferred to employ the reactants in chemically equivalent amounts up to a slight excess (e.g., 1 equivalent excess) of the polyisocyanate. As used herein, the expression "chemically equivalent amount" refers to the amount needed to furnish one isocyanate group per hydroxy or amino group.

The reaction may be accomplished in the presence or absence of diluents. Preferably diluents which include hydrocarbons such as aliphatic, cycloaliphatic and aromatic hydrocarbons, for example, benzene, toluene, cyclohexane, hexane, heptane and the like, are employed; but other diluents, such as methyl isobutyl ketone, diamyl ketone, isobutyl methacrylate, triethyleneglycol dimethacrylate, and cyclohexyl methacrylate can also be beneficially utilized, if desired, especially where complete compatibility with the other ingredients of the composition is desired.

The temperature employed in the reaction may also vary over a wide range. Where the components are combined in approximately chemical equivalent amounts or with slight excess of the isocyanate reactant, useful temperatures may vary from room temperature or below, e.g., 10° C. to 15° C., up to and including temperatures of 100° C. to 175° C. In reacting the simpler isocyanates, the components are preferably combined at or near room temperature, such as temperatures ranging from 20° C. to 30° C. In the preparation of the high molecular weight isocyanate adducts using an excess of the isocyanate, the reactants may be combined at room temperature but are preferably heated at temperatures ranging from 40° C. to 150° C. Reactions conducted at 90° C. to 120° C. have been found to proceed quite smoothly.

A further preferred group of esters usable as polymerizable monomers in the compositions of the invention comprises esters of alkoxylated derivatives of diaryl methanes which esters have the following general formula

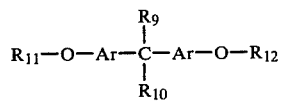

wherein each Ar represents an optionally substituted benzene or other aromatic nucleus, each of $R_9$ and $R_{10}$ is a hydrogen or halogen atom or an alkyl, acryl or hydroxyalkyl group, and each of $R_{11}$ and $R_{12}$ is a group of the formula

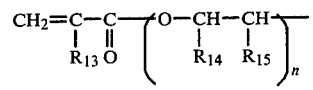

in which each of $R_{13}$, $R_{14}$ and $R_{15}$ is a hydrogen or halogen atom or an alkyl or alkoxy group, and n is an integer from 1 to 20, preferably 1 to 5.

Examples of aromatic nuclei other than benzene (for Ar) are naphthalene, anthracene and other bivalent polynuclear hydrocarbon radicals. By "alkyl" is meant methyl, ethyl or other primary, secondary or tertiary alkyl groups. An example of a hydroxyalkyl group is hydroxyethyl. The preferred halogen is chlorine.

A specially preferred group of esters selected from the above comprises alkoxylated derivatives of Bisphenol A

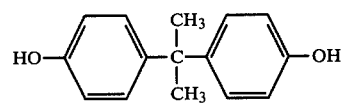

with optional extra o- or m-substitution in the benzene rings, and optional replacement of one or both methyl groups by other groups or atoms.

A monomer of choice is the dimethylacrylate of propoxylated Bisphenol A, in which the number of propoxyl residues in the chain preferably has a value selected from the above mentioned range of 1 to 5.

What is claimed:

1. A composition of matter which is useful in a process for impregnating and sealing of porous articles, the composition comprising:
   (a) an azonitrile;
   (b) a polymerizable acrylic monomer;
   (c) a substituted, sterically-hindered phenol; and
   (d) a metal ion chelator.

2. The composition of claim 1 which further comprises an anionic or nonionic surfactant which is soluble in said polymerizable acrylic monomer and which renders said composition self-emulsifying upon mixing with water.

3. A composition according to claim 1 or 2, wherein said azonitrile is 2,2'-azobis(isobutyronitrile).

4. A composition according to claim 3 wherein said phenol is a member selected from the group consisting of 2,6-di-tert-butyl p-cresol and 2,5-di-tert-butyl hydroquinone.

5. A method for impregnating and sealing a porous article which comprises the steps of:
   (a) impregnating said article with the composition of claim 1; and
   (b) curing said composition while in said porous article.

6. A method for impregnating and sealing a porous article which comprises the steps of:
   (a) impregnating said article with the composition of claim 2;
   (b) washing the surface of said article with water; and
   (c) curing said composition while in said porous article.

* * * * *